Figure 1:
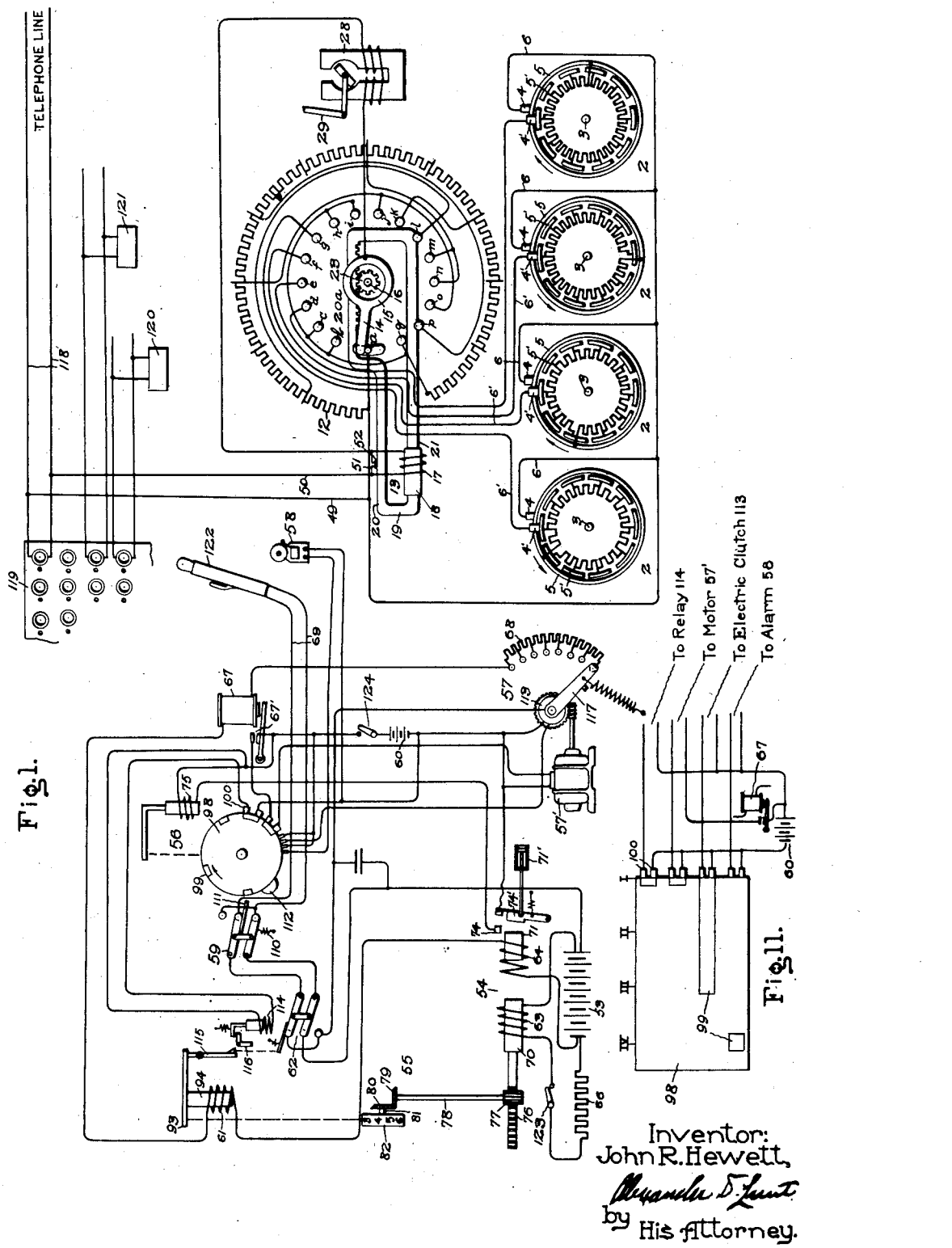

April 7, 1931.  J. R. HEWETT  1,800,019
AUTOMATIC METER READING DEVICE
Filed Nov. 20, 1922  4 Sheets-Sheet 2
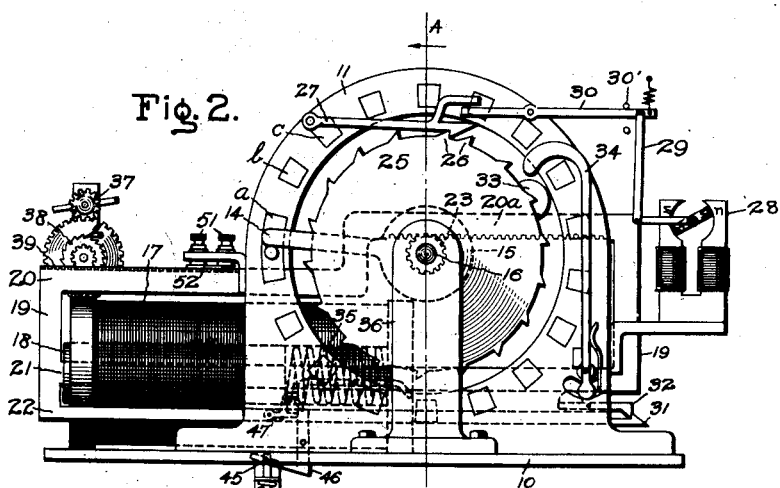
Fig. 2.
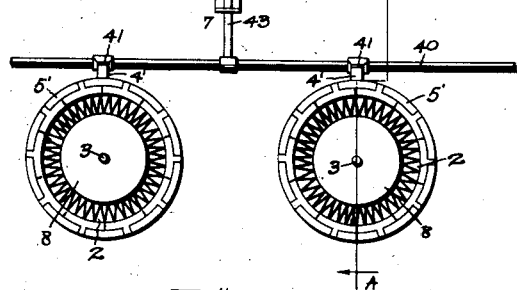
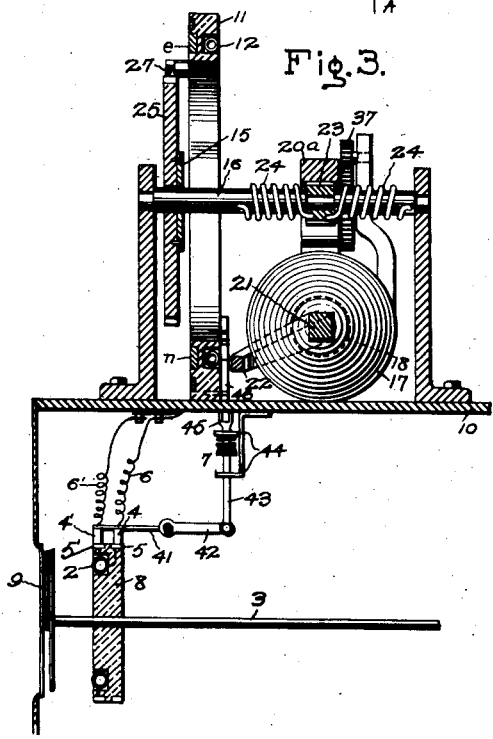
Fig. 3.
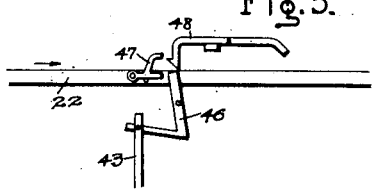
Fig. 5.
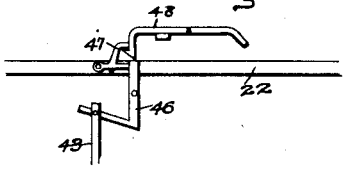
Fig. 6.
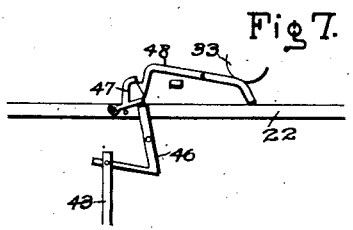
Fig. 7.
Inventor:
John R. Hewett,
by *Alexander S. ---*
His Attorney.

April 7, 1931.    J. R. HEWETT    1,800,019
AUTOMATIC METER READING DEVICE
Filed Nov. 20, 1922    4 Sheets-Sheet 3

Driven by Motor 57

Inventor:
John R. Hewett,
by His Attorney.

April 7, 1931. J. R. HEWETT 1,800,019
AUTOMATIC METER READING DEVICE
Filed Nov. 20, 1922 4 Sheets-Sheet 4
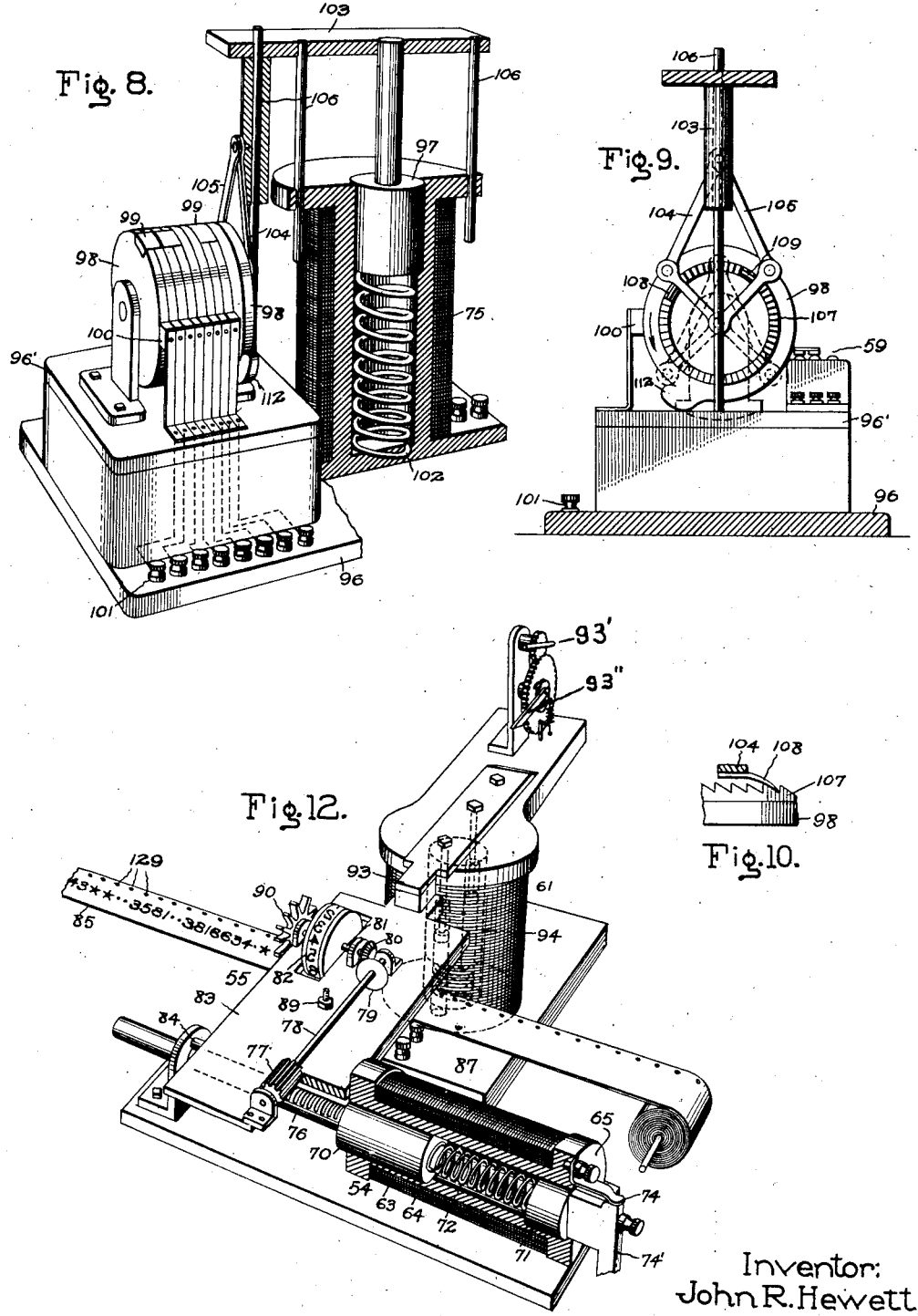
Inventor:
John R. Hewett,
by *His Attorney.*

Patented Apr. 7, 1931

1,800,019

UNITED STATES PATENT OFFICE

JOHN R. HEWETT, OF SCHENECTADY, NEW YORK, ASSIGNOR TO GENERAL ELECTRIC COMPANY, A CORPORATION OF NEW YORK

AUTOMATIC METER-READING DEVICE

Application filed November 20, 1922. Serial No. 602,074.

My invention relates to a system and apparatus therefor for recording the readings of meter dials and the like at a point distant from the meter.

The common practice of reading meters such, for example, as gas and electric service meters, is to have a meter reader make a monthly visit to each customer and take down the readings in a notebook. These readings are then taken to the office and the customer's bill is made out accordingly. Oftentimes the meter reader cannot gain access to the residence or building in which the meter is installed on his first visit and he must return again when the customer is at home. Meter readers sometimes make mistakes in taking down the readings thereby causing misunderstandings and delays. Also, the present system affords a means for unscrupulous and unauthorized persons to gain access to buildings under the pretence of reading the meter. The present system is costly, especially where the meters to be read are scattered in outlying districts.

The primary object of my invention is to provide a system and the necessary apparatus therefor whereby the readings of customers' meters, such as those commonly used for measuring gas, electricity and the like, may all be recorded at a common point such as the central station or main office of a public service corporation, or the central station of a telephone exchange.

It goes without saying that any meter reading system in order to be practicable must be highly reliable and accurate and the necessary sending apparatus which is attached to each meter must not be so expensive so as to prevent the adoption of the system. Another object of my invention is to provide a meter reading system wherein the above-mentioned requirements of practicability are complied with. To this end the sending apparatus for each meter is made as simple as possible consistent with reliability and the action thereof supplemented by a more expensive receiving apparatus. Since one receiving apparatus is sufficient for any number of meters, the expense of constructing the receiving apparatus is not so important a consideration.

Another object of my invention is to provide a system as above outlined which requires but a single pair of wires or a single complete electric circuit between the sending and receiving apparatus. This feature enables me to make use of the ordinary telephone circuit for meter reading purposes.

Another object of my invention is to provide an automatic meter reading system which may be applied to existing meter installations with slight modifications thereof. Other objects and advantages of my invention will appear as the description proceeds.

The apparatus for carrying my invention into effect consists in general of an electric circuit connecting the customers' meters with the central office, electric signalling apparatus associated with the meters to be read, an electric receiving apparatus at the central office by means of which the meter readings are received and recorded, together with the numbers of the meters or names of the customers if that is desirable.

In the preferred embodiment of my invention, I subject the sending apparatus to an electric current of a predetermined character, cause the sending apparatus to alter the character of said current in accordance with signals to be transmitted and actuate the signal receiving apparatus at the receiving station in accordance with said alterations whereby the meter reading, indications or other signals to be transmitted are reproduced at the receiving station.

In the particular form of the apparatus hereinafter described to illustrate my invention, the receiving apparatus is provided with an automatic rheostat which comes into operation when the circuit between the receiving and sending stations is closed in series with a source of direct current, to initially adjust the current in the signalling circuit to a predetermined value. Simultaneously with this adjustment the sending apparatus is placed in condition to successively connect in the signalling circuit a plurality of additional resistances, the values of which are representative of the meter indications to be reproduced. When these adjustments have been made and as soon as the current in the signalling circuit reaches the predetermined value, the operation of the automatic rheostat is suspended and the signal responsive resistances are separately and successively connected in the signalling circuit whereby signalling currents are produced. The various current impulses thus produced in the signalling circuit are caused to select, by suitable apparatus, corresponding printing characters at the receiving station and to operate, through a delayed action, a printing platen, whereby the characters corresponding to the meter readings are printed. The apparatus at the sending station for successively connecting the signaling resistances in circuit comprises a dial switch which is released and allowed to move by a step-by-step movement to successively connect the signaling resistances in circuit. The step-by-step movement is controlled by a relay in the signaling circuit, the action of which is made responsive to the action of the printing platen. When all of the signaling resistances have thus been successively connected in the signaling circuit and characters corresponding to their values printed, the dial switch moves on to the original contact whereby the current in the signaling circuit is brought up to the predetermined initial value. This produces a signal to notify the attendant that the meter reading is completed. The circuit is then disconnected and the various parts of the apparatus are automatically returned to their original conditions. The attendant, who is preferably located at a central plug board, may then electrically connect the receiving apparatus to the sending apparatus of the next meter to be read and the operation is repeated.

Figure 4:
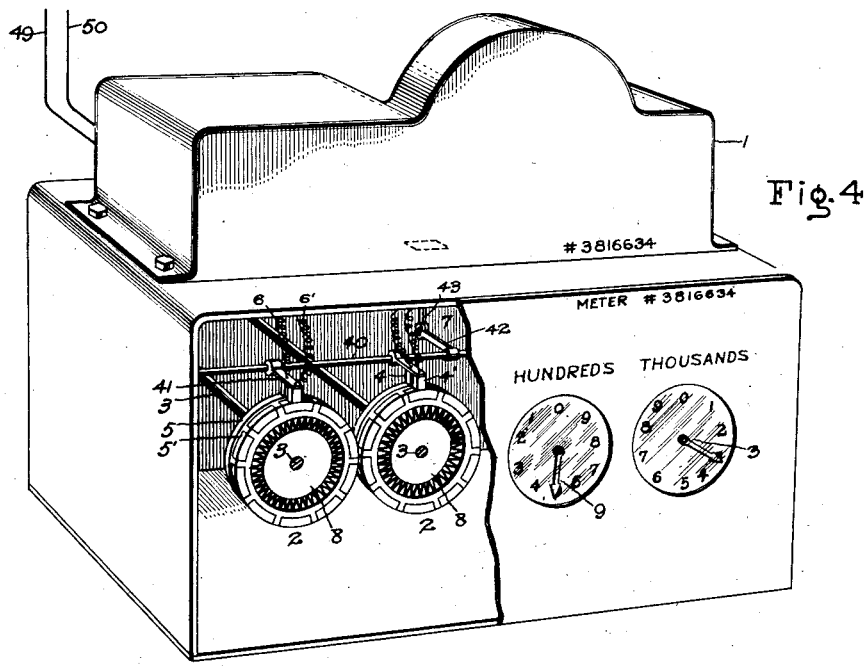
Figure 13:
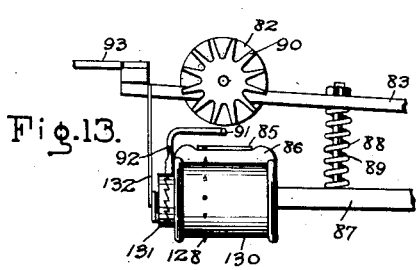
Figure 14:
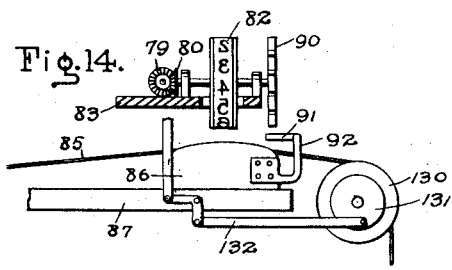
Figure 15:
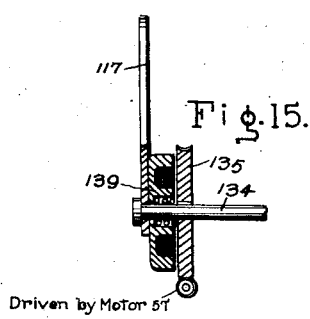

The features of my invention which I believe to be novel and patentable will be pointed out in the claims appended hereto. The details of construction and the operation of one embodiment of my invention will now be explained in connection with the accompanying drawings in which Fig. 1 shows a diagrammatic layout of a complete sending and receiving apparatus, together with the interconnecting signaling circuit; Fig. 2 shows a side view of the sending device which is to be associated with the meter to be read; Fig. 3 shows a cross section of the same device taken on line A—A of Fig. 2; Fig. 4 shows a method of attaching the meter reading signaling sending device to an existing meter installation; Figs. 5, 6 and 7 show different positions of a mechanism for operatively connecting and disconnecting the sending device and the meter; Fig. 8 shows a perspective view of a solenoid operated drum switch associated with the receiving apparatus; Fig. 9 shows a rear view of a ratchet device for operating the drum switch shown in Fig. 8; Fig. 10 shows a detail side view of the ratchet connection; Fig. 11 shows the surface of the drum switch developed and the connections made in its different rotative positions; Fig. 12 shows a perspective view of the selective printing mechanism, constituting an electromagnetically operated typewriter, associated with the receiving apparatus; Figs. 13 and 14 show detail views of the printing wheel and associated parts of the selective printing mechanism of Fig. 12; and Fig. 15 shows a detail view of the electric clutch associated with the motor operated rheostat shown in Fig. 1.

The sending or signaling apparatus is shown in Figs. 1, 2, 3 and 4. In these illustrations the sending apparatus is designed to apply to that type of meter where a plurality of dials reading respectively in units, tens, hundreds and thousands are used. I do not wish to be limited to this use of my invention as it will be evident to those skilled in the art that the invention is applicable to other uses, for example to the reading of indicating type instruments and for general telementric purposes. A meter with a plurality of dials is represented in the lower portion of Fig. 4, a portion of the front casing of the meter being broken away to expose the interior. Placed on the meter casing and preferably secured thereto by bolts or other appropriate means is a casing 1, constituting the housing for the sending device proper which will hereinafter be referred to as the signaling device. The connection between the signaling device and meter by means of which the meter readings are taken off is by way of rheostats 2, one of which is mounted on each dial shaft 3 of the meter so as to be rotated thereby, contacts 4 and 4' normally disengaged from the conducting segments 5 and 5' of the rheostat so that the rotation of the later will impose no additional burden on the meter, electric wires 6 and 6' connected between the contacts 4 and 4' and the signaling device and means designated in general by the numeral 7 operated by the signaling device for pressing contacts 4 and 4' against segments 5 and 5' whenever a meter reading is to be signaled. It will be noted that the apparatus necessary to be installed within the casing of the meter itself requires little space and does not interfere with the ordinary operation and reading of the meter. It is of especial importance that the signal sending apparatus impose no additional burden on the meter to be read as otherwise the meter would not register accurately if at all.

Referring now to Figs. 1 and 4, it will be seen that the resistance of the rheostat is uniformly graduated around the disc 8 of insulating material upon which or in which the resistance element is mounted and that one end of the resistance element is connected to the continuous segment 5 mounted on the rear circumference of the disc while the remainder of the resistance element is connected, at ten equal steps, to ten corresponding commutator like segments 5′ arranged about the front circumference of the disc. Contacts 4 and 4′ are mounted at the top of the discs adjacent segments 5 and 5′ respectively so that when the contacts are brought into engagement with the segments a circuit will be established between wires 6 and 6′ through that portion of the resistance which happens to lie between segment 5 and that segment 5′ opposite contact 4′. The rheostat discs are so connected to the meter shaft that the number of rheostat sections which will be in circuit when the contact is made between the contacts 4 and 4′ and segments 5 and 5′ respectively is the same as the number on the dial to which the dial indicator 9 points. For the purpose of illustration I will take the total resistance of each rheostat 2 as equal to 1000 ohms. Then when pointer 9 is opposite numeral 3, for example, 300 ohms resistance will be contained between those segments opposite contacts 4 and 4′. When pointer 9 is opposite zero all the resistance or 1000 ohms will be contained in the rheostat circuit and when opposite 1, 100 ohms will be contained in the rheostat circuit. The contact 4′ is wide enough to bridge the distance between two adjacent commutator segments 5′ so that the rheostat circuit will always be closed when contact is made irrespective of the exact rotative position of the rheostat disc. All the meter pointers and corresponding rheostats are arranged in this manner and it will thus be evident that if the rheostats corresponding to the four dials are successively and separately connected to an external circuit containing a source of constant voltage, currents inversely proportional to the dial indication will flow. As will be explained in detail later, electric currents so produced and controlled are caused to effect a selective printing device at a distant point to successively print the dial indication.

Casing 1 contains the automatic signaling device, by means of which the resistance circuits, indicative of the meter dial readings, are separately and successively connected to the outgoing signaling wires 49 and 50. Preferably, although not necessarily, this device should also be arranged to send a signal which will identify the meter from all other meters on the system in order to avoid any liability of confusing the meter readings where a plurality of meters are to be read. To this end, the signaling device is arranged to send a signal, before or after the meter reading signals, to identify the meter. This may be accomplished by signaling current which will cause the selective printing device at the receiving station to print, for example, the meter number, the customer's name, the address at which the meter is installed or any combination of the above. The whole system may be made more simple if the meter identifying signal gives the meter number because then the same character of signaling current may be used for sending the meter number and its dial reading, thereby requiring a less complicated selective receiving and printing apparatus. The signaling device which I have illustrated is designed to send signaling currents corresponding to the number of the meter to which it is attached just after the sending of the signaling currents corresponding to the meter dial indications.

Referring to Figs. 2, 3 and the right half of Fig. 1, the signaling device consists of an appropriate base 10 upon which is supported by suitable framework a motor operated selective switch in the form of a rheostat and auxiliary devices for controlling the selective operation thereof, together with means for causing said motor operated switch to operate the connection 7 for connecting and disconnecting the signaling circuit to the meter dial rheostats 2 at the proper times. The selective switch consists of a stationary framework 11 of insulating material, supporting a resistance unit 12, conducting segments $a$, $b$, $c$, etc., which are electrically connected to the proper meter dial rheostats 2 through the wires 6 and 6′ and to the proper points of the resistance unit 12, and a movable contact arm 14 adapted to make contact with and sweep across the stationary conducting segments $a$, $b$, $c$, etc. Contact arm 14 is carried on a hub 15 secured to a shaft 16. The motor for operating the rheostat arm consists in this instance of a solenoid 13 having a stationary energizing coil 17 and a central core 18. Secured to the movable core is a framework 19 provided with three arms, 20, 21 and 22. Arm 21 passes through the center of the core 18 and is rigidly secured thereto in any suitable manner. Arm 20 is positioned above the solenoid parallel to arm 21 and the two are secured together at either end as illustrated. Arm 20 carries a rack 20$^a$ which meshes with the gear 23 rotatably mounted on shaft 16. Secured between shaft 16 and gear 23 is a two-part spring 24. The framework 19, rack 20$^a$, gear 23 and spring 24 constitute the driving connection between the solenoid 13 and shaft 16 to which the rheostat arm 14 is connected. Also secured to shaft 16 is a ratchet wheel 25 provided on its periphery with a number of teeth 26 equal in number to the contact segments of the rheostat. A pawl 27 having one end pivoted to the stationary framework of the rheostat is positioned to engage the teeth 26 of ratchet wheel 25 in such a manner as to normally prevent clockwise rotation of wheel 25, shaft 16 and rheostat arm 14, but to allow free counterclockwise rotation thereof. A reverse current relay 28 operating through levers 29 and 30 is arranged to momentarily disengage pawl 27 from the tooth on wheel 25 with which it is engaged to allow a limited clockwise rotation of the wheel in a manner to be explained. Arm 22 of frame 19 carries on its right end a catch 31 which cooperates with a pawl 32 pivoted to the stationary framework.

It will now be evident that when the solenoid 13 is energized framework 19 will be moved to the right to wind up spring 24 while pawl 32 cooperates with catch 31 to normally prevent the return of the framework when the solenoid is deenergized. The energized position of the device is illustrated in Fig. 2. The cam 33 secured to ratchet wheel 25 cooperates with a pivoted lever 34 to move pawl 32 to disengage the latter from catch 31 when wheel 25 has rotated substantially a complete revolution in a clockwise direction from the position shown in Fig. 2. The gear ratio between rack 20ª and gear 23 is such that a complete revolution of wheel 25, after the spring 24 has been wound up by the energization of the solenoid, substantially unwinds the spring so that separate means must be provided to return the framework and connected parts to a normally deenergized position of the solenoid. For this purpose I provide a spring 35 between the inner end of core 18 and a stationary abutment 36. When solenoid 13 is energized spring 35 is compressed so that when cam 33 operating through lever 34 releases pawl 32 from catch 31, said spring returns the parts to the normally deenergized position of the solenoid with arm 14 on stationary contact a. The center of contact a is provided with a stop which determines the extreme positions of arm 14.

In order to prevent a too rapid return of the parts, a fan brake 37 is provided. This fan brake is geared through a one-way pawl and ratchet driving connection 38 to an auxiliary rack 39 on arm 20 in such a manner that the fan does not oppose the movement of the frame to the energized position but initially retards its return.

The operating mechanism 7 for pressing the brushes 4 and 4' against segments 5 and 5' will now be explained. A shaft 40 suitably supported in bearings extends above the several meter shafts 3 transversely thereto. The shaft 40 carries the arms 41 upon which the contacts 4 and 4' are mounted and also an operating arm 42 which is pivotally connected to a vertical rod 43 slidingly mounted in a support 44. The upper end of rod 43 is forked at 45 and is pivoted to a lever 46. The weight of lever 46 and rod 43 is made sufficient to bias rod 43 downward to turn shaft 40 in a clockwise direction as viewed in Fig. 3 to thereby raise contacts 4 and 4' away from their cooperating segments a small amount. In order to close the electric circuit between the dial rheostats and the signaling device at the proper time and keep them closed during the proper sequence of events, I provide a pawl 47 on the central portion of the reciprocating arm 22 for rotating lever 46 clockwise about its pivot to pull rod 43 upward to close said electric circuits and a pivoted pawl 48 and the cam 33 to release pawl 48 and lever 46 to open said electric circuit after the meter reading signaling currents have been transmitted. The position of these parts when the circuits are closed is illustrated in Figs. 2 and 6. Their position when the circuits are open and pawl 47 is about to engage lever 46 is shown in Fig. 5. Their position when cam 33 operates is shown in Fig. 7.

The electrical connections of the sending apparatus are illustrated at the right of Fig. 1 where it will be seen that one side 49 of the incoming signaling circuit goes to the contacts 4 of the meter rheostats and to that end of the stationary resistance element 12 of the motor operated rheostat which is connected to segment a. The other side 50 of the signaling circuit goes to the coil 17 of solenoid 13, then through relay 28 and to the movable rheostat arm 14. Since the catch 31 and pawl 32 are provided for holding the core and attached parts of the solenoid in the energized position, it will be unnecessary to maintain the coil 17 energized. Therefore, in order to prevent the waste of energy and to simplify the electrical connections, I provide means for short circuiting coil 17 when its core reaches the energized position. This means consists of stationary contact 51 constituting the terminals of coil 17 and movable contact 52 mounted on arm 20 of frame 19 (see Fig. 2). These contacts are so placed that the contacts 51 are short circuited by contact 52 in the energized position shown in Figs. 1 and 2. Upon energizing solenoid 13 the momentum of the parts moved thereby will be sufficient to cause the catch 31 and pawl 32 to engage before the deenergizing of coil 17 takes effect. In some instances it may be desirable to provide a local source of energy for energizing solenoid 13, in which case said source will be controlled by a small relay in the signaling circuit. Referring again to Fig. 1, it will be seen that when arm 14 rests on contact a, the signaling circuit will be short circuited at the signaling device except for the relay 28, the circuit of which is of negligible resistance to the other resistance units now to be referred to. When arm 14 rests on contacts b, c, h, i and q, all of the resistance 12 will be contained in the signaling circuit and for the purpose of comparing the value of said resistance with that of the meter dial resistance units the resistance 12 will be taken as 1100 ohms. As will be explained later any of the positions of rheostat arm 14 which include all of the resistance units 12 in the signaling circuit produces a signaling current of such a value as to cause the selective printing device to print a dot. Contacts $d$, $e$, $f$ and $g$ are connected to the contacts $4'$ of the four meter dial rheostats from right to left respectively, the dial indications of which represent thousands, hundreds, tens and units respectively of the quantity being metered. Thus, when arm 14 rests on contact $d$, a signaling current will be transmitted, the value of which will be representative of the amount of resistance in the circuit of the right-hand meter dial rheostat and which, as has been explained, is indicative of the meter dial readings. In the example to be given, the amount of ohmic resistance in this circuit and dial reading of the right-hand or thousandth dial are taken as 300 and 3 respectively. These conditions are shown in Figs. 1 and 4 respectively. Contacts $j$, $k$, $l$, $m$, $n$, $o$ and $p$ are connected to taps in the resistance unit 12 corresponding respectively to 300, 800, 100, 600, 600, 300 and 400 ohms respectively and these values correspond to the number of the meter to which the device is attached which, in this instance, is taken as number 3816634.

The function of relay 28, which is operated from the receiving station, is to permit rheostat arm 14 to move from contact $a$ to contact $q$ in a clockwise direction by a step-by-step movement such that contact arm 14 successively and momentarily rests on each of said contacts and the teeth on wheel 25 are positioned accordingly. Relay 28 and its associated levers 29 and 30 are so constructed and arranged that when the current flowing through the relay is in one direction, which direction will hereinafter be designated as the normal direction, the parts will stand in the position shown in Fig. 2 with the polarized armature of relay 28 tending to rotate in a clockwise direction. Lever 29 and the right-hand end of lever 30 will be raised against stop $30'$ and the left-hand end of lever 30 will allow pivoted pawl 27 to engage a tooth on ratchet wheel 25 and prevent a clockwise rotation thereof. This condition will also exist when relay 28 is deenergized because of the biasing spring shown at the right-hand end of lever 30. When the current through relay 28 flows in the abnormal direction, its armature will turn in a counterclockwise direction and in so doing will cause levers 29 and 30 to kick pawl 27 upward to disengage the tooth on wheel 25 with which it is engaged. This will permit wheel 25 to rotate in a clockwise direction, but as will be explained hereinafter the abnormal direction of current through relay 28 is never maintained long enough for wheel 25 to rotate more than one tooth's distance at a time.

Before proceeding further with the operation of the sending apparatus, it will be necessary to explain the construction and function of the receiving apparatus which is illustrated in Figs. 8, 9, 10, 11, 12, 13, 14, 15 and the left-hand side of Fig. 1. Referring to the last mentioned figure, the receiving apparatus consists in general of a suitable source of direct current illustrated as a storage battery 53, a differential selective solenoid 54, a printing device 55 operated by solenoid 54, a solenoid operated selective switch 56 controlled by solenoid 54, a motor operated rheostat 57, alarm 58 and a reversing switch 59 controlled by selective switch 56, a source of electric energy 60 for the solenoid operated selective switch 56, rheostat 57 and alarm 58, a solenoid 61 for operating a printing platen in connection with the selective printing device 55 and controlled by the selective switch 56 and a reversing switch 62 controlled jointly by solenoid 61 and selective switch 56.

Referring to Figs. 1 and 12, the selective solenoid 54 comprises two coils 63 and 64 differentially wound one on top of the other on a spool 65 of insulating material. These two coils are connected across a constant voltage direct current source 53 so that their effects will oppose each other. Their ampere turns are so proportioned that under certain conditions the fluxes produced by the two coils will exactly neutralize each other. Coil 63 is connected across source 53 in series with the constant resistance 66. The circuit of coil 64 includes the printing platen solenoid 61, motor cutout relay 67, variable resistance 68, reversing switches 62 and 59 and the outgoing signaling circuit 69. The core of solenoid 54 is divided into two portions 70 and 71. Part 70 is movable and part 71 is fixed. Part 70 is normally biased away from part 71 by a coiled spring 72. When the ampere turns of the two coils are strongly unequal, the resultant magnetic field will overcome the effect of the spring and draw the movable core piece 70 within the solenoid as illustrated in Fig. 12. When the ampere turns are equal, the resultant magnetic field will be zero and core piece 70 will be forced outside the solenoid. At intermediate magnetic fields the portion 70 will assume intermediate positions, depending upon the relative strength of the magnetic field and the tension of spring 72. Adjacent the outer end of core piece 71 is an armature $74'$ carrying a contact which forms with a stationary contact a switch 74 in the circuit of the coil 75 of the solenoid operating selective switch 56. Armature $74'$ cooperates with core 71 in such a way that when the ampere turns of the two coils 63 and 64 are strongly unequal switch 74 is closed but is opened by a spring when the resulting magnetic field produced by said coils is zero or weak. The closing action of switch 74 is made sluggish by means of a dash pot $71'$. The core piece 70 is provided with an axial rack 76 meshing with the gear 77 mounted on a shaft 78. Shaft 78 carries a bevel gear 79 meshing with a bevel gear 80 which turns a shaft 81 upon which is mounted a printing wheel 82. The printing wheel 82 has provided on its periphery the following raised printing characters,—1 to 9 inclusive, zero, a dot and a star arranged in the order mentioned. Between the figure 1 and the star is a blank space. The printing wheel 82, gear 77 and the intermediate parts are mounted on a support 83 which is pivoted at 84 so that the end which carries the printing wheel may be raised and lowered a small amount without disturbing the geared driving connection between rack 76 and gear 77. Printing wheel 82 extends through an opening in the support 83 and opposite the lower periphery of wheel 82 but normally out of engagement therewith is a printing tape 85 supported on a suitable platen 86 mounted on a stationary base piece 87 (see Figs. 13 and 14). The support 83 is normally biased upward with the lower periphery of wheel 82 out of engagement with the tape by means of a spring 88 coiled about bolt 89 between the base 87 and the support 83. A star wheel 90 is also mounted on shaft 81, which wheel cooperates with a finger 91 mounted on a support 92 secured to the platen. The function of star wheel 90 and finger 91 is to exactly position the printing wheel 82 relative to the tape when a printing operation is to be effected. The means for forcing the support 83 together with printing wheel 82 against tape 85 to print the character which happens to be adjacent the tape is the arm 93 connected to the plunger 94 of solenoid 61. Arm 93 hangs over the free end of support 83 and when the solenoid 61 is energized, arm 93 strikes support 83 downward with the correct force to bring printing wheel 82 into engagement with tape 85 and print a figure thereon. Just before the printing is effected, the finger 91 enters the corresponding depression on the star wheel 90 so that if the wheel 82 is not correctly positioned, it will be corrected by the slight rotative movement produced by finger 91 operating on the inclined surface of the said depression. The arm 93 after striking support 83 does not follow said support all the way down as the arm 93 is arranged to reach the limit of its travel at an intermediate point such that solenoid 61 may remain energized and still allow support 83 to raise wheel 82 out of engagement with tape 85. The momentum gained by support 83 upon being struck by arm 93 is sufficient to bring wheel 82 into printing engagement and compress spring 88 and thereafter immediately return against arm 93 with the printing wheel disengaged. Means are provided for moving the record tape 85 along after each printing operation in a manner similar to the movement of the paper in a typewriter. In the present illustration the means for moving the tape along consists of a drum 130, rotatively mounted adjacent base 87 and provided with teeth 128 adapted to engage with corresponding holes 129 in tape 85, a ratchet clutch 131 for advancing the drum by a step-by-step movement and a system of levers 132 connected between the movable support 83 and the outer section of ratchet clutch 131. Each time the movable support 83 is lowered to perform a printing operation, the teeth of the ratchet clutch slip over each other but when support 83 is raised the teeth engage and rotate the drum and move the tape the proper distance.

It will now be evident that the characters to be printed will depend upon the position of core piece 70, which in turn will depend upon the relative strength of the current flowing in coils 63 and 64. Since these currents are produced by a source of constant potential, it will be evident that the effect of coil 63 will be constant and the effect of coil 64 will be inversely proportional to the resistance in its circuit. Thus the position of core piece 70 and printing wheel 82 may be made to depend upon the resistance included in the signaling circuit at the sending station. The ampere turns of coils 63 and 64 are so proportioned and arranged with respect to the strength of spring 72 and the gear ratio between printing wheel 82 and rack 76 that the resistance contained in the signaling circuit determines the rotative position of the printing wheel 82 and these parts are so calibrated with the graduated resistance units associated with the signaling device that the printing character on wheel 82 which corresponds to the particular resistance unit in the signaling circuit at any time will be in printing position. Thus when the 300 ohm resistance unit is connected in the signaling circuit at the sending station, core 70 and rack 76 will take such a position as to rotate printing character 3 on the printing wheel 82 into printing position. In making this calibration the resistance of the signaling circuit itself which, as will be explained, is always maintained at a definite constant value, is taken into consideration.

Referring now to Figs. 8, 9, 10 and 11, the selective switch 56 at the receiving station consists of a base 96 upon which is supported a solenoid comprising coils 75 and core 97, a rotatably mounted drum 98 of insulating material upon which are mounted suitable conducting segments 99, stationary brushes 100 cooperating with the segments 99 and suitably connected to terminals 101 mounted on base 96 and a driving connection between core 97 and drum 98 whereby an up or down movement of core 97 causes drum 98 to revolve 90 degrees in a clockwise direction as viewed in Fig. 8. In the deenergized condition of the solenoid core 97 is biased upward by spring 102 as illustrated. Core 97 is connected through a slidably mounted framework 103 to a pair of links 104 and 105.

The frame slides up and down on guides 106 in response to the actuation of core 97. Fig. 9 shows a rear view of drum 98 and the links 104 and 105. These links have their upper ends pivotally connected to frame 103 and their lower ends pivoted to a stationary support concentric with the axis of drum 98. Closely adjacent the lower portion of the links is a metalic ring 107 concentrically mounted on the rear face of drum 98. The rear edge of ring 107 has ratchet teeth cut therein which cooperate with spring pawls 108 and 109 mounted on the front of the lower portions of links 104 and 105 respectively. The details of the pawl and ratchet connection are shown in Fig. 10. This pawl and ratchet arrangement is such that when core 97 is actuated downward, pawl 108 on link 104 engages with tooth ring 107 and moves drum 98 90 degrees in a clockwise direction as viewed in Fig. 8, pawl 109 on link 105 slipping over the teeth during this movement. The position of the links in the downward or energized position of the solenoid is illustrated in dotted lines in Fig. 9. When the solenoid is deenergized pawl 109 on link 105 engages and rotates drum 98 90 degrees in the same direction as before, pawl 108 now slipping over the teeth in ring 107. Thus, the successive energization and deenergization of coil 75 two times effects a complete revolution of drum 98 in four equal steps. A 90 degree rotation of drum 98 is thus effected by either the opening or closing of switch 74 on the selective solenoid 54.

The reversing switch 59 shown in Fig. 1 is mounted on the rear of the raised base 96' of the solenoid operated switch 56 and is normally biased downward by spring 110. An operating lever 111 stands in the path of a cam 112 so mounted on drum 98 that in one position of drum 98 cam 112 will engage lever 111 and throw switch 59 to the upper position (see Fig. 1). When this switch is momentarily thrown to the upper position by the passing of cam 112 past lever 111, the current in the polarized relay 28 (see Fig. 2) is in the abnormal direction and thus this is one device for causing the clockwise movement of arm 14 to the next successive contact.

The drum switch 56 in addition to controlling the position of reversing switch 59 also controls the energizing circuit of motor 57', motor clutch 113, alarm 58 and relay 114 associated with reversing switch 62. The purpose of relay 114 is to prevent solenoid 61 from operating reversing switch 62 in position I of drum 98. Switch 62 and relay 114 are normally biased upward by suitable springs. The striker arm 93 of solenoid 61 carries on its rear end a jointed rod 115, the lower end of which is free to swing but normally hangs in a position to actuate switch 62 and move it downward when solenoid 61 is energized. However, when relay 114 is energized a finger 116 is moved into the path of the lower end of rod 115 whereby said lower end is swung out of alignment with the actuating member of switch 62 when solenoid 61 is energized and the actuation of switch 62 is thereby prevented. When relay 114 is deenergized the printing solenoid operates reversing switch 62 and this is another means of reversing the current in polarized relay 28 at the sending station. When the two reversing switches 59 and 62 are in their normal positions shown in Fig. 1, the current through relay 28 will flow in a normal direction when its circuit is closed. In some instances it may be desirable to connect a condenser across the signaling circuit ahead of these reversing switches in order to prevent unnecessary sparking and to prolong the current flow in this portion of the circuit.

The motor operated rheostat 57 controls the resistance 68 and consists of a small electric motor 57' of the direct current series type geared to drive a rheostat arm 117 through an electric clutch 113. One member of the electric clutch (see Fig. 15) consists of an electromagnet 139 secured to arm 117 and a rotatably mounted shaft 134. The armature of the electromagnet consists of a worm wheel 135 rotatably mounted on shaft 134 and worm geared to the shaft of motor 57'. The rheostat arm 117 is normally biased to the position shown in Fig. 1 against a stop with all of the resistance 68 in circuit. When energized the motor develops sufficient torque to slowly move rheostat arm 117 against its biasing means to cut out resistance. When the electric clutch 113 is energized, the driving connection between the motor 57' and the rheostat arm is made and the rheostat arm will be held in any position to which it has been moved by the motor due to the irreversible worm gear drive, but when the clutch is deenergized, the driving connection is broken and arm 117 is free to return to the position shown in Fig. 1.

In Fig. 11 the surface of drum switch 98 is shown developed to illustrate the electrical connection effected in the four operating positions thereof. In Fig. 1, the drum is diagrammatically illustrated in its initial or starting position referred to as position I in Fig. 11. The drum 98 must initially be adjusted with respect to its operating means so that it stands in position I when coil 75 is first energized. In this position relay 114 and electric clutch 113 are energized and the circuit of motor 57' is closed provided contacts 67' are closed. In passing from position I to position II, electric clutch 113 remains energized and the circuits of relay 114 and motor 57' are broken. Also in passing to position II cam 112 twice reverses switch 59 (see Fig. 1). In passing from position II to position III, the circuits remain unchanged. Position III as will hereinafter be explained is the meter reading position of the device. In passing to position IV, the clutch 113 is deenergized and the circuit of alarm 58 is closed. The next position of the drum will bring it again to position I, the operation always being in the same direction.

Referring again to Fig. 1, it will be seen that the sending apparatus is connected across a telephone line 118 which in turn is connected to the usual plug board 119 of the telephone central. Other sending apparatus represented at 120 and 121, similar to that previously described except for the arrangement of the resistance taps which identify the meter number, are also shown connected to the plug board 119. The outgoing signaling circuit 69 of the receiving device is shown provided with a plug 122 which may be inserted into the plug board to connect any one of the sending apparatus to the receiving apparatus. This plug is provided with a finger on one side adapted to fit into a corresponding hole in the plug board to prevent the signaling circuits from being reversed at this point. While I have here described the usual telephone circuit and plug board, it will be evident that any electrical circuit and any type of connection switch, such for example, as are found in automatic telephone centrals, may be used. Furthermore, it will be evident that line 69 may constitute the usual telephone line leading from the office of a public service corporation to the telephone central. In any event, it will be seen that my automatic meter reading system may be used by merely running a pair of wires from the house telephone circuit to the sending apparatus connected to the meter to be read and connecting the receiving apparatus to the same telephone circuit.

The meter reading system and apparatus is primarily designed to replace the meter reader who goes from house to house each month and takes down the meter readings in a notebook. The automatic reading of the meters may be carried on at an early hour in the morning when the telephone lines are not being used to any extent for ordinary purposes. To use my automatic meter reading system the receiving apparatus is either installed near the plug board 119 or the alarm 58 is positioned where it can be heard by the plug board operator and the receiving apparatus installed at any other desirable point and connected to the plug 122 and alarm 58 by suitable circuits as illustrated in Fig. 1. When plug 122 is removed and disconnecting switches 123 and 124 are open, the various circuits of the receiving apparatus are dead so that there is no wasting of the sources 53 and 60 when the apparatus is not in use. Under these conditions the receiving apparatus will stand in the position illustrated in Fig. 1 with all of its parts deenergized. The sending apparatus will also stand in the deenergized position; that is to say, core 17 of solenoid 13, together with frame 19, will be in the extreme left-hand position with springs 24 and 35 released. Arm 14 will stand on contact $a$ and the brushes 4 and 4' will be raised.

The first operation to put the apparatus in condition for use is the closing of switch 123. This strongly energizes solenoid 54 and draws plunger 70 in, compressing the spring 72 and rotates wheel 82. Armature 74' is also drawn in, closing switch 74. Under this condition of solenoid 54 printing wheel 82 is adjusted and calibrated to have its blank space over the printing platen. Switch 124 is next closed which places the circuits controlled by drum switch 98 in condition for operation and also energizes coil 75 of solenoid 56 since switch 74 is closed. Before inserting plug 122 drum 98 must be adjusted to position I if it is not already in that position. This energizes relay 114 and closes the drum contacts of motor 57'. The apparatus and system is now ready for the automatic reading of the meter, which operation is started by inserting plug 122 into the proper socket of plug board 119 to connect the receiving and sending apparatus together over the signaling circuit consisting of lines 69, 118, 49 and 50.

The insertion of plug 122 closes the signaling circuit including coil 64, solenoid 61, relay 67, rheostat 68, reversing switch 62 (upper position), reversing switch 59 (lower position) at the receiving station, and coil 17, relay 28 and rheostat arm 14 on contact $a$ at the sending station. At the sending station solenoid 13 is energized, frame 19 moves to the right to the position shown in Figure 1, winding up spring 24, compressing spring 35, actuating connection 7 which closes the meter dial rheostats to the respective contacts $d$, $e$, $f$ and $g$, latching pawl 32 into catch 31 and finally short circuiting coil 17 by means of contacts 51 and 52. The polarity of the circuits having been previously traced out and marked, plug 122 is always inserted in the same way such that the direction of current through the polarized relay 28 is in the normal direction and consequently the relay is not actuated under these conditions. At the receiving station the effect of coil 63 is still strongly predominant because of the high resistance 68 in the signaling circuit which has not as yet had time to be adjusted, but the current flowing in coil 64 decreases the magnetization of solenoid 54 to such an extent that core piece 70 readjusts its position so as to turn wheel 82 slightly and bring the star directly over the printing platen. At the same time solenoid 61 operates bringing striker arm 93 down, which forces wheel 82 into contact with the tape to print a star thereon. The arm 115 operated by solenoid 61 does not operate reversing switch 62 at this time because relay 114 is energized and pawl 116 moves the lower portion of the arm out of alignment with switch 62. Relay 67 is also energized to close the circuit of motor 57' which now starts to run and drives rheostat arm 117 in a counter-clockwise direction through magnetic clutch 113, which is also energized, to cut resistance 68 out of the signaling circuit. The motor 57' continues to run until the ampere turns in the coils 63 and 64 are equal, whereupon switch 74 opens, deenergizing solenoid 56 and allows drum 98 to be turned to position II, in which position the circuit of motor 57' is broken. However, the rheostat arm 117 remains in the position to which it has been moved. It may be here noted that the motor operated rheostat 68, solenoid 54 and drum switch 98 constitute automatic means for initially adjusting the resistance of the signaling circuit to such a value that the ampere turns of coils 63 and 64 are equal and in order for this to be true the resistance 68 must have such a range that the ampere turns of coils 63 and 64 can be made equal with either the longest or shortest telephone line of the system connected in circuit. This feature assures that the resistance of the signaling circuit will initially be adjusted to a definite value so that all subsequent equal changes in resistance of this circuit will have the same effect upon solenoid 54. In passing from position I to position II the cam 112 on drum 98 moves reversing switch 59 to its upper position just long enough to actuate reverse current relay 28 and then releases switch 59. This reversing operation and likewise the reversing operation of switch 62 is so quick that solenoids 54 and 61 do not have time to actuate before the circuit is reestablished and the only thing effected thereby is the reverse current relay 28 at the sending station, which in reversing the position of its armature, actuates levers 29 and 30 and kicks out pawl 27. Pawl 27 moves up and down and allows wheel 25 to revolve in a clockwise direction one tooth's distance before it is caught again by the pawl. This operation moves arm 14 to contact $b$ and in so doing, momentarily breaks the signaling circuit and closes it again through resistance 12. The decrease in the ampere turns of coil 64, due to the insertion of the additional resistance, causes core 70 to assume a position such as to bring the dot on the printing wheel into printing position. The momentary breaking and making of the circuit actuates the printing device and a dot is printed. Armature 74', which is more sluggish in its inward movement than core piece 70, is attracted because the breaking of the signaling circuit and the insertion of resistance 12 therein destroys the balance of the ampere turns of coils 63 and 64. Consequently switch 74 is closed. Due to this unbalanced condition switch 74 will remain closed until arm 14 reaches its last position on contact $a$ because in all of the intermediate positions additional resistance is included in the signaling circuit. The closing of switch 74 actuates solenoid 56 and moves drum 98 to position III, where it will remain until arm 14 reaches contact $a$. In positions II and III of drum 98 the circuit of coil 114 is deenergized so that the second and subsequent printing operations actuate reversing switch 62 which in turn actuates relay 28 to allow arm 14 to move in a clockwise direction. Thus, while drum 98 remains in position III, or meter reading position, switch 62 will be reversed twice by each complete actuating of the printing solenoid 61. The actuation of the reversing switch 62 occurs at the same instant as the printing operation is effected and therefore any fluctuations in the current in the signaling circuit due to the reversing operation does not have time to produce an error in the position of printing wheel 82, which position is determined by the current in the signaling circuit the instant before the printing operation is completed. Preferably the actuation of solenoid 61 is made slightly sluggish by means of a fan brake 93' geared to a finger 93'' which stands in the path of arm 93 in its raised position, in order to give core 70 ample time to rotate printing wheel 82 into the correct printing position before the actual printing is effected.

It will now be seen that the cycle of events which take place while drum 98 remains in position III is the reversing of the current in relay 28, the advancement of rheostat arm 14 from one contact to the next, which deenergizes and energizes the signaling circuit, the movement of core piece 70 and printing wheel 82 to a position corresponding to the new value of resistance in the signaling circuit and the actuation of the printing device which prints the figures or characters corresponding to the new value of resistance in the signaling circuit, reverses the current through relay 28 and steps the printing tape along for the next operation. This cycle of operation continues until arm 14 reaches contact $a$ and in so doing, the figures or characters corresponding to each value of the additional resistance successively included in the signaling circuit by the contacts $d$, $e$, $f$, $g$, $h$, $i$, $j$, $k$, $l$, $m$, $n$, $o$, $p$ and $q$ cooperating with arm 14 are successively printed on the tape in the order mentioned. Contacts $d$, $e$, $f$ and $g$ cause the reading of the meter dials to be printed and it will be observed from an inspection of the meter dial resistances shown in Fig. 1, having regard for the direction of rotation of said resistances shown by the arrows thereon, that the readings correspond to the value "3581". Referring to Fig. 2, it will be seen that when arm 14 moves from contact $g$ to contact $h$, cam 33 actuates pawls 48 and 47 which releases lever 46 and connection 7 thereby causing brushes 4 and 4' to be lifted from segments 5 and 5' respectively. Thus, it will be evident that the normal operation of the meter will only be interfered with during the interval of time required for arm 14 to move from contact $a$ to contact $h$ which is only a fraction of a minute. Referring again to Fig. 1, it will be seen that the closing of contacts $h$ and $i$ causes two dots to be printed, the closing of contacts $j$, $k$, $l$, $m$, $n$, $o$ and $p$, corresponding to the meter number, causes said number to be printed which in the example given is "3816634", and the closing of contact $q$ causes another dot to be printed. When arm 14 reaches contact $a$ cam 33 actuates lever 34 which releases pawl 32 from catch 31 and spring 35 starts slowly to return the moving parts of the sending device to the normally deenergized position of solenoid 13 and at the same instant all of the additional resistance at the sending device is short circuited whereupon the ampere turns of coils 63 and 64 are again equal and opposite in their effect and switch 74 opens. This deenergizes solenoid 56 and drum 98 moves into position IV deenergizing magnetic clutch 113 and energizing the circuit of alarm 58. Rheostat arm 117 returns to the position shown in Fig. 1 whereby all of the resistance 68 is placed in the signaling circuit. Before the resistance 68 has again been inserted in the signaling circuit, the printing wheel has been turned to bring the star into printing position and the star printed. As soon as the plug board operator hears the alarm, the plug 112 is pulled out and this happens before the short circuit of coil 17 is removed because the initial returning movement of frame 19 is very slow. Meantime, armature 74' is slowly moved to close switch 74 which causes drum 98 to move to position I and the receiving apparatus is again in position to start another meter reading. In the example given, the tape will read

"* .. 3581 .. 3816634 .. *".

The plug 122 is then inserted to connect the receiving apparatus with the next meter to be read and the operation is repeated.

By means of my invention a night operator at the telephone central may, in addition to his or her other duties, which are ordinarily very light at an early hour in the morning, operate the automatic meter reading apparatus and thus save the expense and time and inconveniences of a house to house meter reader. When a tenant moves out of a building it is not necessary for the public service corporation to send a man to obtain the final reading of the meters nor is it necessary for them to gain access to the building in which the meters are installed as my invention provides a means for reading the meters at any time by merely making a simple electrical connection between the meter equipped with the sending device and the receiving apparatus. In some cases it may be desirable to obtain a direct visual indication of the meter reading and where this is desirable, the receiving apparatus may be equipped with a suitable dial and pointer graduated with and operated from the same shaft which drives the printing wheel.

Another important application of my invention is its use in obtaining the meter readings of automatic substations and power stations where it is deemed advisable not to employ an attendant. In such a case the several instruments to be read would have their indicators move current regulators such as rheostats similar to the ones previously described, each connected to a selective dial switch which would successively connect the electric controllers to an outgoing signaling circuit. The contacts for the station identifying number might be omitted and the dial switch arranged to best suit the existing conditions and number of meters to be read.

I do not wish to be limited to the exact construction of the apparatus herein described, as it will be evident to those skilled in the art that various modifications may be made without departing from my invention. The operation of the system herein described is automatic, but I believe that certain features of the system are novel and patentable irrespective of the automatic features and I therefore desire to cover in the appended claims all modifications in construction and operation which come within the true spirit and scope of my invention.

What I claim as new and desire to secure by Letters Patent of the United States, is:—

1. In a system for obtaining readings at a central station from a plurality of sending stations connected by a pair of conductors to a central station comprising a sending station, a receiving station, a central station, and pairs of electric conductors connecting said sending and receiving stations to said central station, means at said central station for separately connecting said sending station with said receiving station through said conductors, and means associated with said receiving station for initially causing the resistance of the circuits established by said connecting means to be equal to a definite value.

2. A telemetric system wherein a receiving station is adapted to be connected to any one of a plurality of sending stations through separate electric circuits, a variable resistance adapted to be inserted in the circuit through which the stations are connected, and automatic means responsive to the initial resistance of such circuit when said stations are connected for varying said variable resistance until the resistance of such circuit equals a predetermined value, and means for delaying any telemetric transmission of signals over said system until such resistance is adjusted.

3. In a telemetric system a sending station comprising a plurality of movable elements, an electric regulator for each of said elements adapted to be moved so as to produce a signaling current responsive to the position of its corresponding element, an electric signaling circuit and means controlled by the direction of current flow in said circuit for successively and automatically connecting said regulators in said circuit.

4. A telemetric sending station comprising a plurality of movable indicators, a corresponding number of variable resistances the value of which at any instant is dependent upon the respective positions of said movable indicators, a plurality of fixed resistances indicative of the station number, a signal circuit, and means controlled from a distant point over said circuit for separately connecting each of said resistances in said circuit.

5. A telemetric sending station, a plurality of signal sending electric current regulators thereat, a signal circuit, a switch for separately connecting said current regulators in said circuit, an electric motor for storing mechanical energy for operating said switch, means for locking said switch against operation, an electric relay for momentarily releasing said locking means to permit said switch to move from one connection to another, and means for controlling said electric motor and relay over said signal circuit from a distant point.

6. In a telemetric sending station, a meter rotated shaft provided with a dial indicator, a resistance element moved by said shaft past a pair of stationary contacts, said resistance element being so graduated that the value of the resistance included between said contacts at any time corresponds to the dial indication, means for normally holding said contacts out of engagement with said resistance element whereby the latter imposes no additional burden on the meter, a signaling circuit adapted to be connected to said contacts and means controlled over said circuit from a distant point for moving said contacts into engagement with said resistance element.

7. In a telemetric sending station, a plurality of signaling resistances some of which are variable and some of which are fixed, a signaling circuit, a switch for separately and successively connecting said resistances in said circuit, operating means for said switch controlled over said circuit from a distant point, normally open contacts between said switch and said variable resistances and means controlled by the operation of said switch for closing said contacts.

8. A telemetric sending station provided with a station identifying number, a movable indicator having a plurality of numbered positions, resistances having values corresponding to said station and position numbers respectively, a signaling circuit and means for successively connecting the resistance corresponding to the position of the indicator and the resistance corresponding to the station number in said circuit.

9. In a telemetric system a receiving station comprising electromagnetic responsive means for receiving a signal, a signaling circuit adapted to be connected thereto and means controlled by said signaling receiving means for regulating the resistance of said signaling circuit to a definite predetermined value when said circuit is closed.

10. In a telemetric system in which a signal receiving device is adapted to be connected to any one of a plurality of sending stations over electric circuits, comprising a receiving station and a sending station connected by an electric circuit, means for causing the resistance of said circuit to be equal to a predetermined value comprising a variable resistance in the circuit at the receiving station and means set in operation by the closing of a signaling circuit and responsive to its resistance for regulating said variable resistance until the total resistance of said signaling circuit is equal to said predetermined value.

11. A signal receiving device comprising an electric solenoid provided with a pair of differentially wound coils one of which is adapted to be included in a signaling circuit, a common source of direct current for energizing said coils, a core and an armature moved in response to the differential effect of said coils, means controlled by said armature for initially varying the resistance of the signaling circuit until the ampere turns of said coils are equal, and a printing wheel moved by said core to select printing characters corresponding to subsequent signaling currents in the signaling circuit.

12. A receiving station for a telemetric system comprising in combination an electric solenoid having a pair of differentially wound coils one of which is adapted to be included in an outgoing signaling circuit, a source of direct current for energizing said coils, a printing wheel controlled by said solenoid for selecting a printing character corresponding to the value of signaling current in the signaling circuit and a printing device operated by the signal current for causing the character selected by said printing wheel to be printed.

13. A receiving station for a telemetric system comprising a signal receiving device, a printing wheel moved by said device to select a printing character corresponding to a signal received by said device, means responsive to the transmission of said signal for printing the character selected and means for delaying the action of said printing means until the printing wheel has been moved into its correct position.

14. In a system for obtaining readings at a central station from a plurality of sending stations connected by electric circuits comprising a sending station and a receiving station electrically connected together by a signaling circuit, means responsive to the establishment of said connection for adjusting a characteristic of said circuit to a predetermined value, means responsive to said adjustment for causing said sending apparatus to alter said characteristic in accordance with signals to be transmitted, and means at said receiving station responsive to said alterations for receiving and reproducing said signals.

15. A telemetric system comprising signal sending and receiving stations, a movable element at said sending station, means at said sending station for transmitting a signal indicative of the position of said movable element, said transmitting means and movable element being normally electrically and mechanically disengaged whereby no additional burden is imposed on said movable element, means responsive to the closing of a signaling circuit between the sending and receiving stations for connecting said transmitting means and movable element into signal transmitting relation and means responsive to the transmission of a signal for disengaging the movable element and transmitting means from signal transmitting relation.

16. A telemetric signal sending station provided with an outgoing signalling circuit and a dial switch for separately and successively connecting a plurality of signal sending devices to the outgoing signalling circuit and a step-by-step operating means responsive to the reception of signals at a distant point over said circuit for actuating said dial switch.

17. In a telemetric system having automatic signal sending and receiving stations adapted to be connected together by an electric circuit, the method of reproducing at the receiving station signals sent from the sending station which consists in electrically connecting said systems by the circuit, adjusting a characteristic of the circuit to a predetermined condition, starting the sending station into operation in response to said adjustment, and automatically reproducing said signals at the receiving station.

18. A telemetric system for obtaining the reading of a house type meter at a distant point comprising a receiving station, a sending station including a house type meter provided with a plurality of indicating dials, a source of electric energy, a single electric circuit between the sending and receiving stations supplied by said source, automatic means at the sending station for successively varying the magnitude of the current in said circuit in accordance with the several dial indications of said meter, and means at the receiving station controlled by the current in said circuit for reproducing said dial indication, whereby said meter reading may be obtained at the receiving station without the customary practice of sending a meter reader to obtain such reading.

19. A telemetric system for obtaining the reading of a house type meter at a distant point comprising in combination with a plurality of indicating dials of such a meter, of automatic means associated therewith for successively transmitting electric signals indicative respectively of the readings of said dials, a receiving device adapted to be connected to said signal transmitting means over an electric circuit to receive said signals, a printing wheel moved by said receiving device in response to said signals to successively select printing characters corresponding to the dial indications, and a printing mechanism responsive to the transmission of said signals for printing the characters selected.

20. A telemetric system for obtaining the reading of a house type meter at a distant point comprising in combination a sending station including a movable dial indicator of a house type meter, an automatic signal sending device associated with said indicator for transmitting an electric signal indicative of the position of said indicator and for transmitting other signals of a similar nature to identify the meter, an automatic signal receiving device adapted to be electrically connected with said sending device, a printing wheel in said receiving device moved in response to said signals to select printing characters corresponding to the dial indicating and meter identifying signals respectively, and a printing device responsive to the transmission of said signals for causing the selected characters to be printed.

21. An electric current telemetric system for multiple dial house type meters comprising a sending station, a receiving station and an interconnected electric circuit, automatic apparatus at the sending station adapted, when energized over said circuit, to be moved by a step-by-step movement to successively transmit a succession of electric signals respectively indicative of the several dial indications of such a meter, receiving and printing apparatus at the receiving station for moving a printing wheel to select printing characters corresponding to said signals, a printing device included therein actuated by the signalling current to print said characters as they are selected, and means operated by said printing device for causing said signal transmitting apparatus to move to the next succeeding step.

22. A telemetric system for multiple dial house type meters comprising a sending station, a receiving station, and an electric signalling circuit connecting said stations, automatic apparatus at the sending station for successively connecting said circuit to a series of electric signalling devices the positions of which correspond to the respective dial indications of such a meter whereby dial indicating signals are transmitted, a reverse current relay in the signalling circuit at the sending station for controlling the operation of said connecting apparatus, means at the receiving station for receiving and printing characters corresponding to the transmitted signals, and means operated by said printing means for momentarily reversing the current in said signalling circuit.

In witness whereof, I have hereunto set my hand this 18th day of November, 1922.

JOHN R. HEWETT.